(12) United States Patent
Seager

(10) Patent No.: US 10,226,878 B2
(45) Date of Patent: *Mar. 12, 2019

(54) PART PACK OPTIMIZATION

(75) Inventor: Richard David Seager, Norwich (GB)

(73) Assignee: Thurne-Middleby Ltd. (GB)

( * ) Notice: Subject to any disclaimer, the term of this patent is extended or adjusted under 35 U.S.C. 154(b) by 1516 days.

This patent is subject to a terminal disclaimer.

(21) Appl. No.: 12/100,522

(22) Filed: Apr. 10, 2008

(65) Prior Publication Data

US 2008/0250907 A1 Oct. 16, 2008

(30) Foreign Application Priority Data

Apr. 13, 2007 (GB) .................................. 0707154.1

(51) Int. Cl.
| | | |
|---|---|---|
| *A22C 17/00* | (2006.01) | |
| *B26D 5/00* | (2006.01) | |
| *B26D 7/01* | (2006.01) | |
| *B26D 7/30* | (2006.01) | |
| *B26D 7/32* | (2006.01) | |

(52) U.S. Cl.
CPC ............ *B26D 7/30* (2013.01); *A22C 17/0033* (2013.01); *B26D 7/32* (2013.01); *B26D 5/00* (2013.01); *B26D 7/01* (2013.01); *B26D 2210/02* (2013.01); *Y10T 83/04* (2015.04); *Y10T 83/145* (2015.04); *Y10T 83/148* (2015.04); *Y10T 83/182* (2015.04)

(58) Field of Classification Search
CPC .......... A22C 17/033; B26D 7/01; B26D 7/30; B26D 7/32; B26D 2210/02; B26D 5/00; Y10T 83/0538; Y10T 83/145; Y10T 83/148; Y10T 83/155; Y10T 83/162; Y10T 83/173; Y10T 83/182

USPC ............... 83/42, 73, 74, 75.5, 76.1, 76.6, 77
See application file for complete search history.

(56) References Cited

U.S. PATENT DOCUMENTS

| | | |
|---|---|---|
| 3,846,957 A | 11/1974 | Divan |
| 4,065,911 A | 1/1978 | Fagan |

(Continued)

FOREIGN PATENT DOCUMENTS

| | | |
|---|---|---|
| DE | 3617336 A1 | 11/1987 |
| DE | 3703807 A | 8/1988 |

(Continued)

OTHER PUBLICATIONS

Search report in EP 08251367.

(Continued)

*Primary Examiner* — Clark F Dexter
(74) *Attorney, Agent, or Firm* — Barnes & Thornburg LLP

(57) ABSTRACT

A food slicing machine is provided for slicing food products such as bacon, cheese or cooked meat for sale as groups of slices in separate packs. The food slicing machine includes a cutter for cutting slices from the food product and a controller for controlling the thickness of the slices. The machine cuts slices according to a first value of a slicing parameter until the controller determines when the amount of food product remaining to be sliced in an end portion of the food product is less than a predetermined group weight threshold. The controller causes a slice to be cut according to a second, different value of the slicing parameter from the end portion for addition to an under-weight group of slices, so that its weight at least equals the predetermined group weight threshold.

6 Claims, 1 Drawing Sheet

(56) References Cited

U.S. PATENT DOCUMENTS

| | | | |
|---|---|---|---|
| 4,216,689 A * | 8/1980 | Suhling | 83/77 |
| 4,368,790 A * | 1/1983 | Ives | 177/50 |
| 4,548,108 A | 10/1985 | Dennis | |
| 4,794,996 A * | 1/1989 | Wallace et al. | 177/25.14 |
| 4,894,976 A * | 1/1990 | Wallace et al. | 53/435 |
| 4,941,375 A * | 7/1990 | Kasper | 83/23 |
| 5,042,340 A * | 8/1991 | Kasper | 83/73 |
| 5,109,936 A * | 5/1992 | Ruppel | 177/25.19 |
| 5,890,342 A * | 4/1999 | McDonald et al. | B26D 7/30 53/502 |
| 6,320,141 B1 * | 11/2001 | Lindee et al. | B26D 5/00 177/116 |
| 6,640,681 B1 | 11/2003 | Weber | |
| 2004/0134319 A1 * | 7/2004 | Sandberg | 83/13 |
| 2007/0193425 A1 | 8/2007 | Weber | |
| 2008/0190303 A1 | 8/2008 | Hiederer et al. | |

FOREIGN PATENT DOCUMENTS

| | | |
|---|---|---|
| DE | 4409908 A1 | 10/1994 |
| DE | 19914707 A1 | 10/2000 |
| DE | 10334643 A1 | 3/2005 |
| DE | 10342499 B4 | 4/2005 |
| DE | 102004058873 A1 | 8/2006 |
| DE | 102006007490 A1 | 8/2006 |
| DE | 102005010183 A1 | 9/2006 |
| DE | 102005047796 A1 | 4/2007 |
| EP | 0246668 A2 | 11/1987 |
| GB | 2173008 A | 10/1986 |
| GB | 2276950 A | 10/1994 |
| WO | 2004062375 A2 | 7/2004 |
| WO | 2004106020 A1 | 12/2004 |
| WO | WO-2007/0022782 A2 | 3/2007 |

OTHER PUBLICATIONS

Search report in GB0707154.1.
English translation of DE 3703807A1.
English translation of DE 102005047796A1.
English translation of DE 3617336A1.
English translation of DE 10334643A1.
English translation of DE 10342499B4.
English translation of DE 102005010183A1.

* cited by examiner

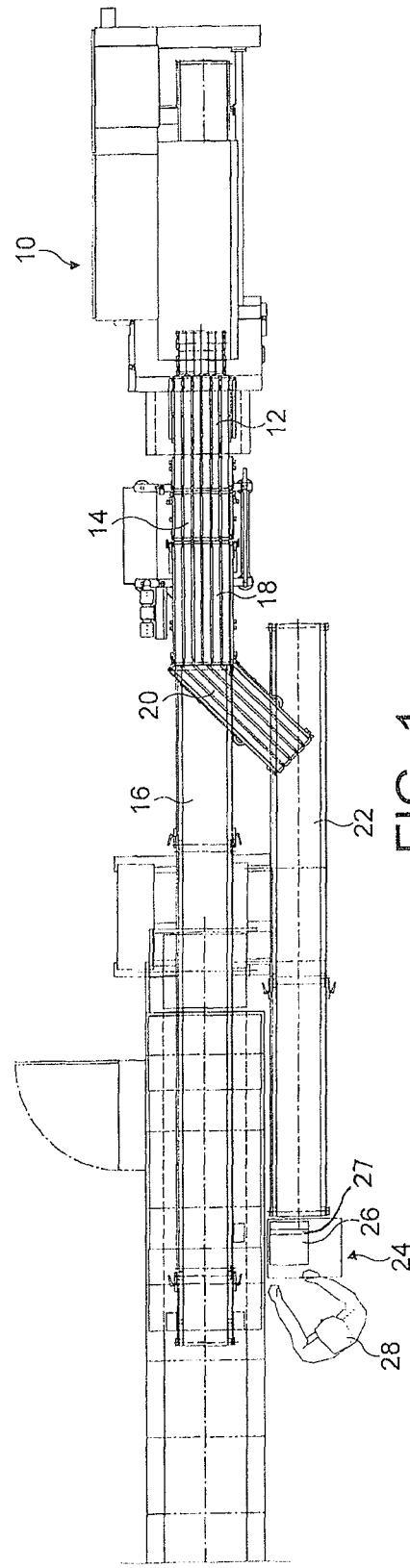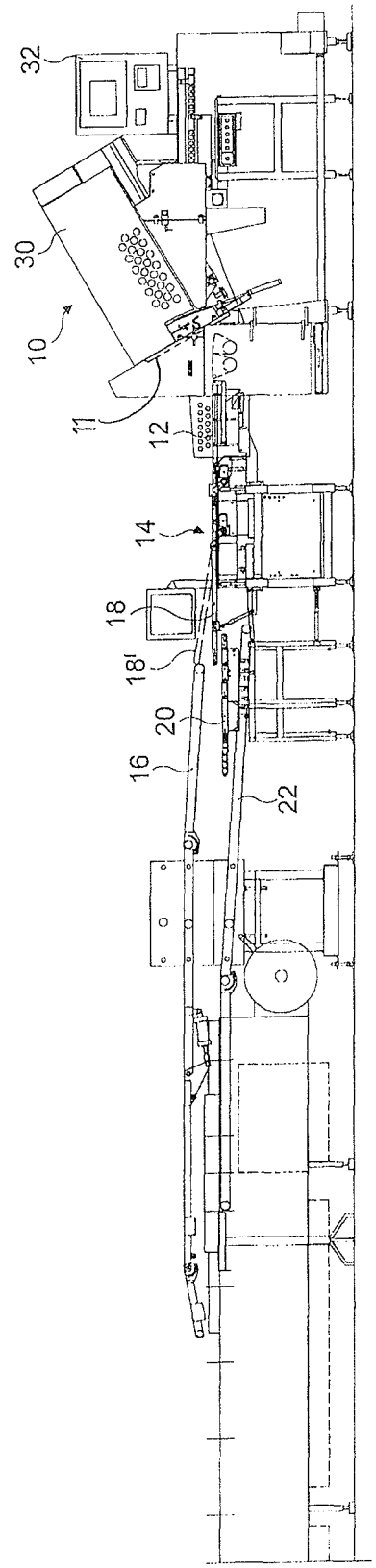

PART PACK OPTIMIZATION

FIELD OF THE INVENTION

The present invention relates to machines for slicing food products (such as bacon, cheese or cooked meat). Particularly, it relates to the use of such machines to prepare groups of slices for sale in separate packs and efficient control of the slicing process.

BACKGROUND TO THE INVENTION

Increasingly, food retailers and supermarkets in particular require suppliers to provide packs of sliced food products of standard weights. Labelling regulations may permit deviation from the standard weights indicated on packs within narrow tolerances.

It is therefore desirable for food suppliers to aim to provide packs which just meet the associated weight requirements, minimising the extent to which any minimum requirement is exceeded. Any such excess food product included in a pack is often referred to as "give-away".

In view of the pressure to just satisfy a minimum requirement, groups of slices are occasionally generated by a slicing machine which are slightly below this minimum threshold. In known processing arrangements, these "under-weight" groups are diverted out of the path to the packaging process and to a separate station, sometimes referred to as a "make-weight" station. An operator at the make-weight station adds an additional slice to each under-weight group of slices and then returns the group made up to an acceptable weight with the additional slice into the path to the packaging process.

This process tends to increase give-away, as under-weight packs are likely to fall short of the minimum threshold by an amount less than the weight of an entire additional slice. For example, a slice of bacon may typically weigh 20 g. If an under-weight group of slices only falls short by 2 g, the under-weight group together with an additional slice created at the make-weight station will include a give-away of 18 g. Given the large number of under-weight packs likely to be generated by a processor having a high throughput of food packs, the cumulative give-away is substantial and therefore costly.

SUMMARY OF THE INVENTION

The present invention provides a food slicing machine comprising a cutter for cutting slices from a food product and a control arrangement for controlling the thickness of the slices cut by the cutter so that the machine cuts slices according to a first value of a parameter, wherein the control arrangement is arranged to determine when the amount of food product remaining to be sliced in an end portion of the food product is less than a predetermined group weight threshold, and is operable to cause a slice to be cut according to a second, different value of the parameter from the first value from said end portion for addition to an under-weight group of slices so that its weight at least equals the predetermined group weight threshold.

The predetermined threshold of remaining food product represents the amount required for a complete group or pack of slices according to the current slicing settings of the machine. An amount less than this represents an incomplete group or "part-pack".

In this way, the machine may enable the thickness of the slices cut from the end portion or part-pack of a log of food product to be different (smaller) in order to complete under-weight groups of slices that have been generated, with a reduced level of give-away.

One or more of the slices cut from the end portion of the log may be of a thickness determined in accordance with the first value of the parameter. This first value represents the current setting of the slicer for a standard or normal slice (referred to as the slicer "set point"). Thus, part of the end portion may be used to provide standard slices to be combined with other slices in order to make up a complete pack. In addition, one or more slices of the end portion are cut at a different thickness.

Preferably, the slicing machine is configured so as to visually differentiate between slices cut from an end portion which are cut according to the first "standard" value of the parameter and those cut according to a different value of the parameter to enable differentiation therebetween downstream in the processing system. For example, sets of slices cut according to different parameter values may be offset from each other to a greater extent than the individual slices in each set.

The control arrangement may be operable to receive a request signal, and to calculate the second value in response to the request signal. The request signal represents feedback from downstream in the system relating to a property or properties (such as the weight) of the groups of slices generated by the slicer. This enables the slicer control arrangement to adjust its set point as appropriate to reduce give-away. The size of the slices cut in response to request signals may correspond on a one-to-one basis with the sizes indicated by respective request signals. Alternatively, the size of the slices cut in response to the request signals may be determined on the basis of analysis of a plurality of request signals. For example, the size of the cut slices may be based on an average of slice sizes indicated by request signals.

A request signal may instead indicate an incremental increase or decrease in the current slicer set point.

In preferred embodiments, said parameter is slice volume or weight. Where a log of food product has a variable cross-section, the slicing machine may include apparatus for determining the area of the end face at the end of the food product being cut. This then enables the slice thickness to be calculated which generates a slice of the desired slice volume or weight.

The present invention further provides a food processing system for preparing groups of slices of a food product with each group having a weight greater than a predetermined group weight threshold, including a food slicing machine as described herein, a weighing apparatus for weighing each group, and an arrangement for generating said request signal and sending it to the food slicing machine.

An input device may be provided to enable an operator to initiate generation of a request signal having determined the weight of an under-weight group of slices using the weighing apparatus. Alternatively, the weighing apparatus may be operable to initiate generation of a request signal automatically when it detects an under-weight group of slices.

According to a further aspect of the invention, a method of slicing a food product is provided which comprises the steps of cutting slices according to a first value of a parameter from a food product; determining when the amount of food product remaining to be sliced in an end portion of the food product is less than a predetermined group weight threshold; cutting a slice according to a second, different value of said parameter from the first value from said end portion; and adding the slice cut according to the second value to an under-weight group of slices so that its weight at least equals the predetermined group weight threshold.

BRIEF DESCRIPTION OF THE DRAWINGS

Embodiments of the invention will now be described by way of example and with reference to the accompanying schematic drawings wherein:

FIG. 1 shows a plan view of a food slicing and weighing system according to an embodiment of the invention; and FIG. 2 is a side view of the system shown in FIG. 1.

DETAILED DESCRIPTION

The system shown in FIGS. 1 and 2 includes a food slicing machine 10, having a cutter 11, which outputs slices of a food product onto conveyor 12. This in turn feeds groups of slices through a weighing station 14.

Groups of slices which are detected by the weighing station as meeting predetermined weight requirements are passed on to an "on-weight" conveyer 16 by a pivotable section of conveyor 18. Alternatively, groups of slices which fall outside the predetermined weight requirements are diverted by pivotable conveyer 18 and angled conveyor 20 on to an "off-weight" conveyor 22.

In FIG. 2, pivotable conveyor 18 is shown in a lowered orientation, which diverts groups of slices towards the off-weight conveyor. Its alternative orientation in which groups of slices continue on to the on-weight conveyor is shown by dashed lines (18').

Groups of slices travelling down the on-weight conveyor are carried to a packaging station (not shown) for sealing into respective packs. Groups of slices diverted on to the off-weight conveyor 22 are carried down to a make-weight station 24 which includes a set of weighing scales 26.

Slicing machine 10 includes an inclined loading bed within a housing 30 for supporting a log of food product to be sliced. The log is fed towards a cutter 11 in the form of a rotating slicing blade located at the lower end of the loading bed. A slice thickness controller 32 is programmable to control the operation of the slicing machine. It includes a display and control panel to enable an operator to monitor its operation and enter commands as appropriate.

A gripper (not shown) engages the trailing end of the food product and feeds it towards the slicing blade. The distance by which the product is fed past the blade determines the slice thickness.

The slicer may be programmed to slice a given food product at a given "set point". This set point is a parameter relating to the size of the slices to be cut. It may, for example, represent a desired slice thickness. Alternatively, in a system able to measure the cross-sectional area of the end face of the food product which is being cut, the set point may represent a desired slice volume or weight. On the basis of the measured cross-sectional area, the controller determines the slice thickness needed to achieve the set point volume or weight and controls the slicer accordingly.

In the embodiment of the invention shown in FIGS. 1 and 2, the weighing scales 26 at the make-weight station include a control panel or input device 27 for use by an operator 28. Using the scales, the operator is able to determine how far below the desired weight the off-weight groups of slices received are. The operator can then use the control panel 27 to request slices to make up the off-weight groups whilst minimising the amount of give-away. Request signals are then sent from the scales 26 to the controller 32 of the slicing machine. Alternatively, these scales may automatically generate request signals in response to the measured weight of off-weight groups of slices.

The controller is able to determine the amount of a log of food product remaining to be sliced on the basis of the position of its gripper at the trailing end of the log. Each group of slices will include a certain number of slices sliced according to the current set point of the control 32. Accordingly, the controller is able to calculate when less than a complete group of slices remains to be sliced from a particular log. Based on the request signals received from the make-weight station, the controller causes the slicing machine to cut one or more slices from this end portion which differ from the current set point for subsequent use at the make-weight station.

Each slice may be cut to match a specific slice request from the make-weight station. Alternatively, the controller may analyse a number of requests together and calculate a slice thickness which can best meet these requests whilst minimising the amount of give-away.

Depending on the number of slice requests received from the make-weight station, the controller may arrange for the slicing machine to cut pan of the end portion at the set point thickness and the remainder at the thickness responding to the requests.

To enable an operator at the make-weight station to readily distinguish between slices cut from the end portion which are at the set point thickness and those which are not, the slicing machine can be controlled to present the respective sets of slices on the conveyor in such a way that the operator can readily visually distinguish between them. For example, to one set of slices may be set back from the first set by a distance greater than the normal offset between adjacent slices. The set of slices cut at the set point thickness may be combined at the make-weight station with other part-packs from other end portions to create complete groups which can then be placed onto the on-weight conveyor 16 by the operator 28. Similarly, the operator is able to add the slices cut at a thickness different than the set point thickness to off-weight groups of slices which can then also be put onto on-weight conveyor 16 and subsequently packaged.

It will be appreciated that operations carried out at the make-weight station could be automated to a greater extent, for example by the use of one or more robotic arms to manipulate individual slices or groups of slices to create on-weight groups and then place them on the on-weight conveyor. Furthermore, under-weight groups could remain on the conveyor 16 and be topped up by a robotic arm or arms as they travel towards, or are located in, the packaging station.

In a further variation, request signals may be fed back to the controller from the weighing station 14, rather than the make-weight station, which will then be processed by the controller in the manner described above.

The invention claimed is:

1. A food processing system for preparing groups of slices of a food product with each group having a weight at least equal to a predetermined group weight threshold, the system including:

a food slicing machine for outputting groups of slices, the machine comprising (a) a cutter for cutting slices from a food product log, and (b) a slice thickness controller which controls the thickness of the slices cut by the cutter so that the machine cuts slices according to a first value of a slice size parameter, with the first value selected with the aim of each group of slices cut according to the first value having a weight at least equal to the predetermined group weight threshold;

a weighing apparatus for weighing each group outputted by the slicing machine to check whether its weight either is at least equal to the predetermined group weight threshold or is below this threshold and the group is under-weight; and a make-weight apparatus including a weighing scale, wherein the weighing scale generates a request signal to request a slice to make up an under-weight group to the predetermined group weight threshold, and the weighing scale sends the request signal to the slice thickness controller of the food slicing machine, wherein the slice thickness controller:

calculates in response to the request signal a second value of the slice size parameter for a single slice to be added to the under-weight group of slices so that its weight at least equals the predetermined group weight threshold;

determines when an end portion of the food product log remains to be sliced which is less than the predetermined group weight threshold; and controls the cutter to cut a single slice, according to the second value of the slice size parameter, from said end portion for addition to the under-weight group of slices so that its weight at least equals the predetermined group weight threshold.

2. A system of claim 1 wherein the slice thickness controller controls the cutter to cut at least one slice from said end portion according to the first value of the slice size parameter.

3. A system of claim 1 including a conveyor for receiving slices outputted by the food slicing machine, wherein groups of slices cut according to the first value from the food product log are outputted from the food slicing machine onto the conveyor such that they are spaced apart by a first distance along the conveyor, and a slice cut from the food product log according to the second value of the slice size parameter is outputted from the food slicing machine onto the conveyor at a location spaced along the conveyor from an adjacent preceding slice in a group of slices cut according to the first value by a second distance that is greater than the first distance.

4. A system of claim 1 wherein the second value of the slice size parameter is determined by the slice thickness controller in response to a plurality of the request signals.

5. A system of claim 1 wherein said slice size parameter is slice volume, weight or thickness.

6. A system of claim 1 wherein the make-weight apparatus includes an input device to enable an operator to initiate generation of the request signal upon detection, using the weighing scale, of an under-weight group of slices.

* * * * *